US007172004B1

(12) United States Patent
Corston

(10) Patent No.: US 7,172,004 B1
(45) Date of Patent: Feb. 6, 2007

(54) APPARATUS FOR APPLYING COMPRESSIBLE GASKET TO BEAMS

(76) Inventor: Charles Corston, 501 Willow Ct. South, Bellingham, WA (US) 98225

( * ) Notice: Subject to any disclaimer, the term of this patent is extended or adjusted under 35 U.S.C. 154(b) by 165 days.

(21) Appl. No.: 10/915,150

(22) Filed: Aug. 9, 2004

(51) Int. Cl.
*B32B 37/00* (2006.01)

(52) U.S. Cl. ......................... 156/391; 156/71; 156/577

(58) Field of Classification Search ................ 156/391, 156/538, 556, 574, 71, 577
See application file for complete search history.

(56) References Cited

U.S. PATENT DOCUMENTS

| | | | | |
|---|---|---|---|---|
| 4,039,367 A * | 8/1977 | Warshaw et al. | ........... | 156/486 |
| 4,849,063 A * | 7/1989 | McXinnon | .................. | 156/391 |
| 5,110,391 A * | 5/1992 | Taguchi et al. | ............. | 156/250 |
| 5,254,203 A | 10/1993 | Corston | | |
| 5,403,414 A | 4/1995 | Corston | | |
| 5,580,413 A * | 12/1996 | Assink et al. | ............... | 156/361 |
| 5,718,092 A | 2/1998 | Corston | | |
| 6,263,636 B1 | 7/2001 | Corston | | |
| 6,615,890 B1 * | 9/2003 | Sigafoes | ..................... | 156/355 |

* cited by examiner

*Primary Examiner*—James Sells
(74) *Attorney, Agent, or Firm*—Todd N. Hathaway

(57) ABSTRACT

An apparatus for applying strips of resiliently compressible gasket material to upper edges of beams that are fed therethrough. The apparatus includes a bed having a plurality of rollers that support the beams passing thereover, there being at least one drive roller for frictionally engaging the beams in drive relationship therewith. A guide maintains the beams in a predetermined orientation as they pass through the apparatus. An applicator roller presses against the upper edges of the beams, with the strip of resiliently compressible gasket material being guided under the applicator roller so that an adhesive layer on a lower surface thereof is pressed into adhesive engagement with the upper edges of the beams. An extensible blade actuated by a sensor cuts the strip of gasket material at the end of each beam.

20 Claims, 9 Drawing Sheets

APPARATUS FOR APPLYING COMPRESSIBLE GASKET TO BEAMS

RELATED APPLICATIONS

This application claims the benefit of U.S. Provisional Patent Application No. 60/493,605 filed on 8 Aug. 2003.

BACKGROUND a. Field of the Invention

The present invention relates generally to installation of compressible gasket material on the edges of joists, studs and other beams for use in construction of buildings and other purposes, and, more particularly, to an apparatus for automatically applying the compressible gasket material to the upper edges of such beams as the beams are fed through the apparatus.

b. Related Art

The present invention relates to the subject set forth in the inventor's prior patents U.S. Pat. No. 6,263,636, U.S. Pat. No. 5,718,092, U.S. Pat. No. 5,403,414 and U.S. Pat. No. 5,254,203.

The foregoing patents relate to a compressible gasket that is installed between beams and overlying panels in the construction of buildings. The beams maybe be, for example, floor joists with overlying plywood flooring or wall studs covered by sheetrock panels. Moreover, the beams may be formed of wood or steel or of other materials. Depending on the application the resiliently compressible gasket provides several important advantages, including reduction/elimination of floor squeaks, reduction of noise transmission between adjoining rooms, and reduction of thermal transmission.

As is explained in the foregoing patents and as is shown in FIGS. 1–2, the principal method of installing the gasket has involved manual application of adhesive-backed compressible foam tape to the edges of the beams. For example, FIG. 1 shows operator 10 applying strips of the gasket material 12 to floor joists 14, using an applicator tool 16 in which there is an elongate handle 18 having a spool of resiliently compressible tape 20 mounted on its lower end. The tape is a compressible foam material, installed on the roll with its adhesive side facing outwardly. The strips 12 are thus laid out and adhered to the joists as the operator rolls the applicator along the upper edges thereof, in the direction indicated by arrow 22. The plywood floor panels 24 are then placed atop of the joists, and fasteners 26 are driven through the plywood and compressible gasket into the underlining joists.

In FIG. 1, the gasket material is applied after the floor has been framed, so that the operator is able to walk about on the joists while employing the applicator. FIG. 2 shows a second method of manual application, in which the strip of gasket material 12 is applied to the joist 14 prior to installation. In this instance, individual joists are placed atop sawhorses 28 or other supports, and the operator 10 rolls a spool 20 of tape on the upper edge of the joist in the direction indicated by arrow 30. As this is done, the operator applies a downward pressure with his hands, so that the strip of gasket material firmly adheres to the joist. As well as joists, the gasket can be applied in the same manner to studs and other beams before installation.

Although all these prior techniques have proven satisfactory for many applications, they are insufficiently rapid and efficient for others. For example, a manufactured home facility, using either metal or wooden beams, may wish to produce a large number of the beams rapidly and with minimal labor. Similarly, a lumberyard may wish to produce large numbers of beams for subsequent sale or distribution. Even when the gasket material is applied at the job site itself, i.e., where the building is being constructed, it may be desirable to apply the gasket material more quickly and with less labor than is possible with the manual methods discussed above.

One potential solution has been offered in the proposed application of the gasket material while it is in a liquid form. However, this requires a separate technology and does not employ the adhesive backed foam material that is presently available. Moreover, the size, cost and nature of the equipment necessary for liquid application renders this impractical for use at most any site except for a dedicated factory.

Accordingly, there exists a need for an apparatus for applying a layer of adhesive-backed gasket material to the edges of beams in a rapid and efficient manner with minimal manual labor. Furthermore, there exists a need for such an apparatus where it is able to employ the adhesive backed resilient foam tape that is presently available for use as a gasket material. Still further, there exists a need for such apparatus that is sufficiently compact and inexpensive that it may be employed in any of a variety of facilities or work locations. Still further, there exists a need for such an apparatus that is durable and reliable in operation.

SUMMARY OF THE INVENTION

The present invention has solved the problems cited above, and is an apparatus for applying strips of resiliently compressible gasket material to the upper edges of beams that are fed therethrough.

Broadly, the apparatus comprises: (a) a bed portion for supporting the beams for passage thereover; (b) means for advancing the beams longitudinally over the bed portion; (c) guide means for maintaining the beams in a predetermined orientation as the beams pass through the apparatus; (d) an applicator roller for pressing against the upper edge of the beams; and (e) means for guiding a strip of resiliently compressible gasket material under the applicator roller, so that an adhesive layer on a lower surface of the strip is pressed into adhesive engagement with the upper edges of the beams.

The apparatus may further comprise means for cutting the strip of gasket material at the end of each beam as it passes through the apparatus. The means for cutting the strip may comprise a blade member positioned to the side of the strip, and means for extending the blade member from a retracted position to an extended position in which the blade passes through and severs the strip. The means for extending the blade may comprise of a sensor for detecting the end of a beam as it passes it by the blade member.

The bed for supporting the beams may comprise a roller bed having a plurality of rollers at spaced locations. The means for advancing the beams may comprise at least one drive roller for frictional engaging a surface of the beam, and a drive motor operably connected to the drive roller. The drive means may further comprise an idler roller mounted to engage the beams opposite the drive roller so as to support the beams in frictional engagement with the drive roller.

The guide means may comprise first and second longitudinally-spaced, horizontal-axis rollers for engaging the upper edges of the beams, and first and second pairs of parallel, transversely-spaced, vertical-axis rollers for engaging the sides of the beams. The guide means may also comprise first and second guide plates for directing incoming beams into the predetermined orientation between the guide rollers.

The guide rollers and guide plates may be selectively adjustable to accommodate beams having different heights and widths. The spacing between the drive and rollers may also be selectively adjustable.

These and other features are the advantages of the present invention will be apparent from a reading of the following detailed description with reference to the accompanying drawings.

DETAILED DESCRIPTION OF THE DRAWINGS

Figure 1:
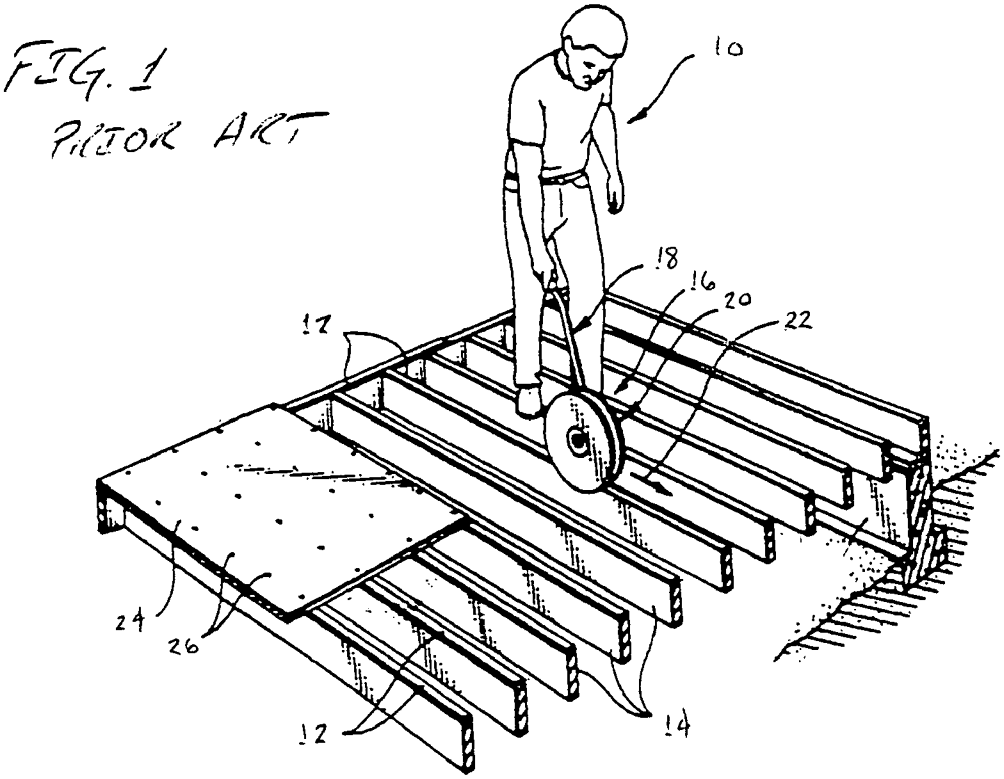
FIG. 1 PRIOR ART
FIG. 1 is a perspective, cutaway view of a framed-in floor, showing the manner in which gasket material is applied to the joists thereof using a rolling applicator in accordance with a method of the prior art.
Figure 2:
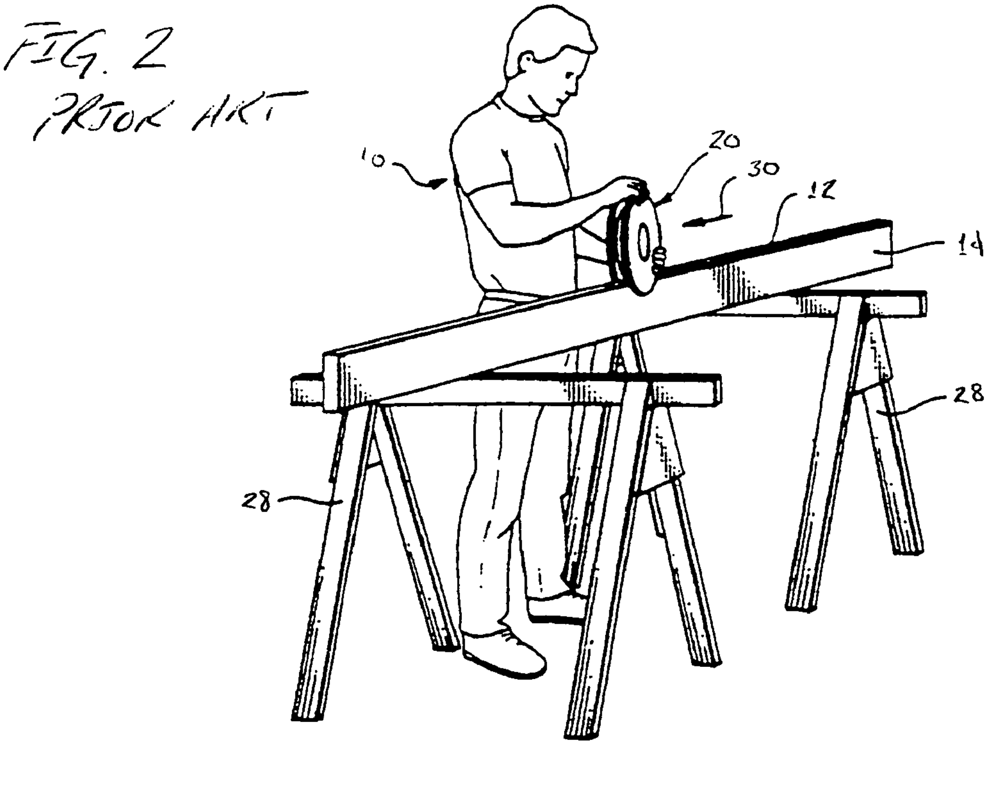
FIG. 2 PRIOR ART
FIG. 2 is a perspective view of an individual joist resting on sawhorses, showing the manner in which a strip of gasket material is applied thereto by manually rolling a spool of the gasket material thereon in accordance with another method of the prior art.
Figure 3:
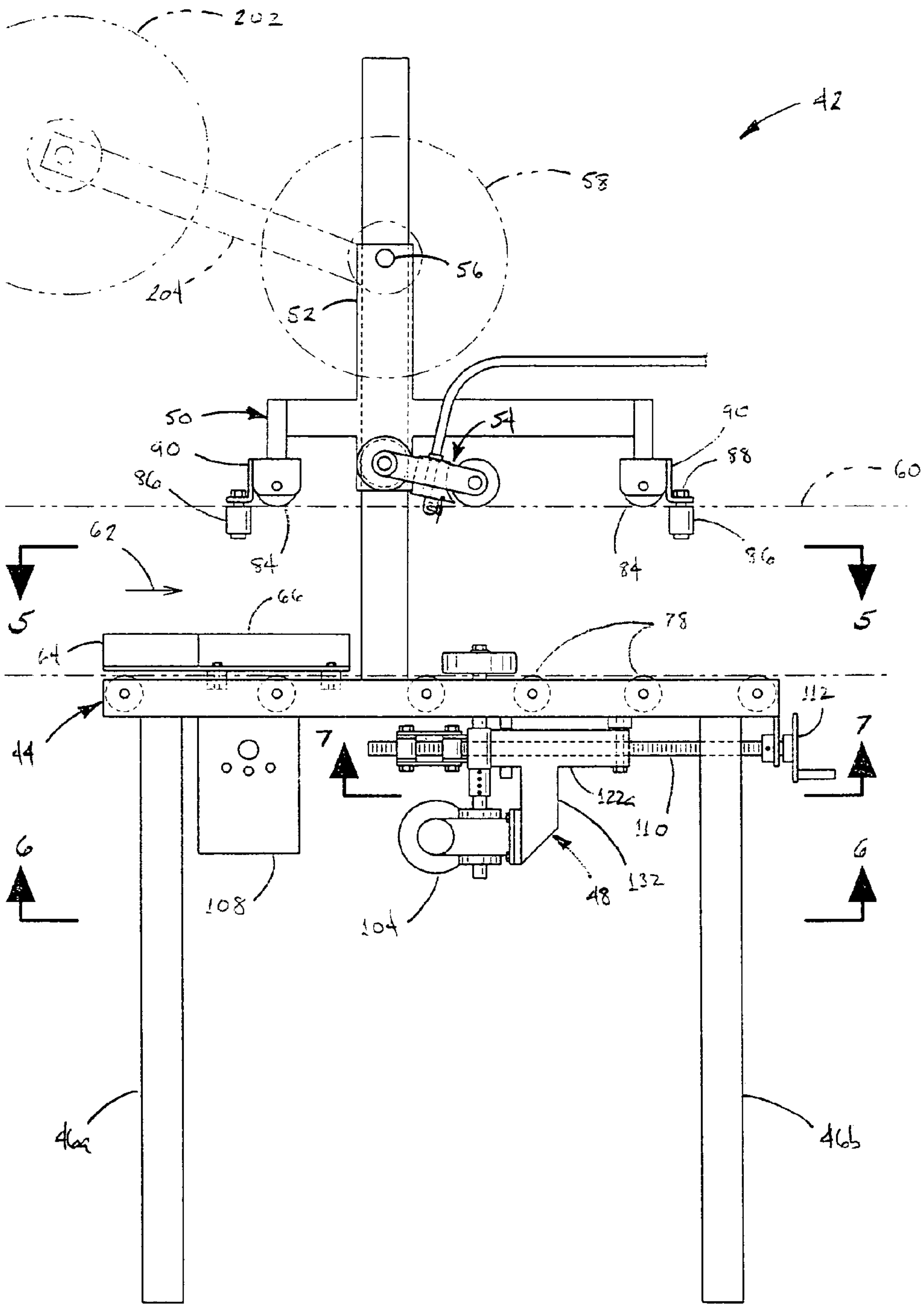
FIG. 3 is a front, elevational view of a gasket application apparatus in accordance with the present invention, with the path of the beams therethrough being indicated by broken line image.
Figure 4:
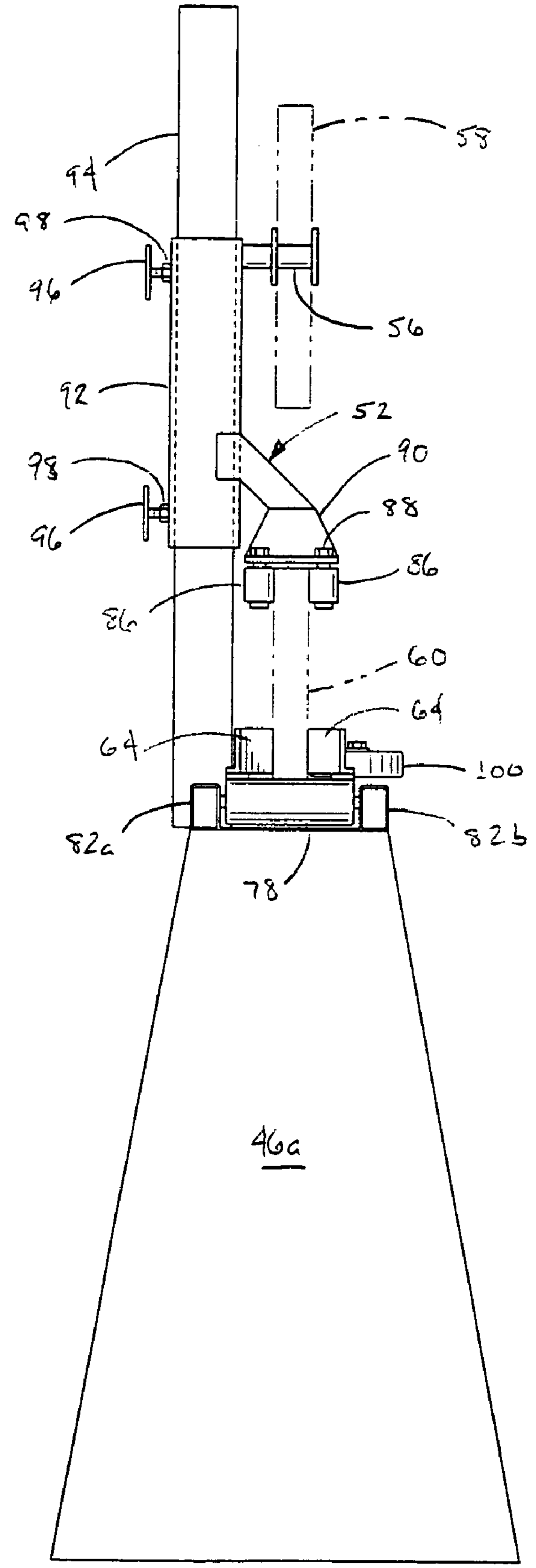
FIG. 4 is an end, elevational view of the gasket application apparatus of FIG. 3, showing the mechanisms that guide and orientate the beam in greater detail.

FIGS. 3–4 show a gasket application apparatus 42 in accordance with a preferred embodiment of the present invention. Major components of the apparatus include a roller table assembly 44 that is supported at a suitable height (e.g., approximately waist-high) by legs 46*a*, 46*b*. An adjustable drive assembly 48 is mounted beneath the roller table 34, while an upper guide assembly 50 is mounted on an adjustable height frame 52 above the table. Also mounted on the frame is a spring loaded roller and cutter assembly 54, and an axle 56 for the spool 58 of gasket material. As will be described in greater detail below, these components cooperate to feed beams through the apparatus in a progressive fashion as the compressible gasket material is applied and adhered to the upper edges thereof.

Figure 5:
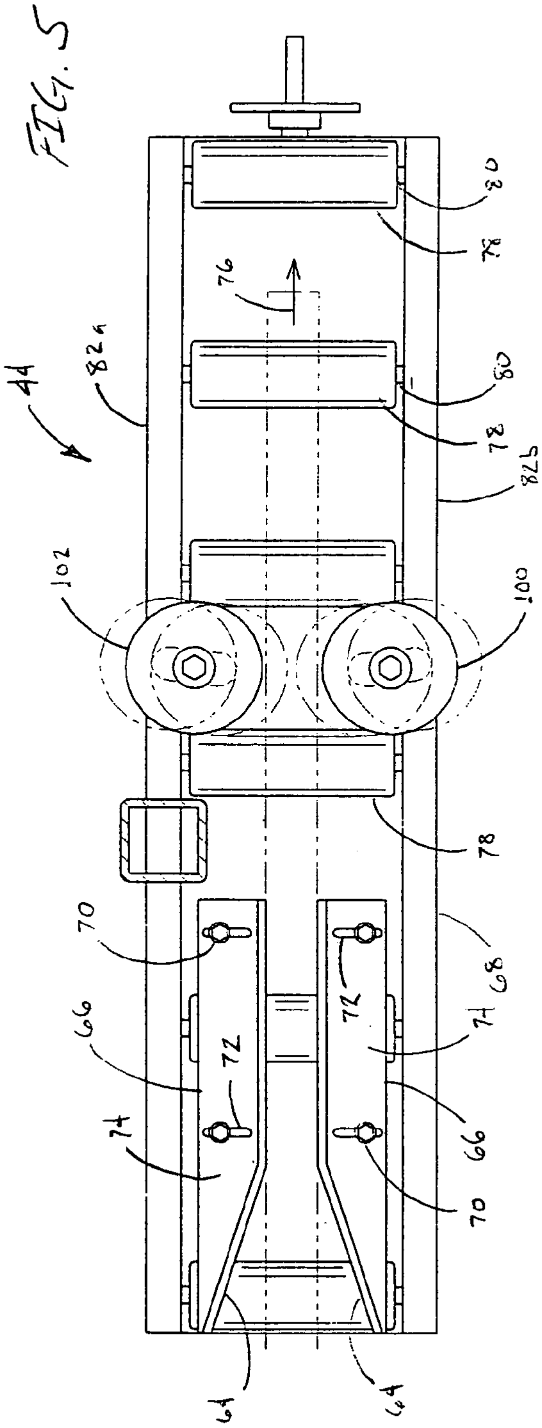
FIG. 5 is a top, plan view of the roller cable of the apparatus of FIGS. 3–4, taken along the line 5—5 in FIG. 3, showing the manner in which the gap between the powered and idle rollers is adjustable to accommodate beams having different thicknesses.

In combination, the rollers and guides of the roller cable and guide assembly define a path 60 of adjustable heigth and width. The beams (e.g., 2×6 dimensional lumber) advance through the apparatus along this path in the direction indicated by arrow 62, being received from a feed conveyor (not shown) or other feed mechanism or being fed into the apparatus by a manual operator. As this is done, the leading ends of the beams are engaged by the splayed ends 64 of laterally spaced guide plates 66 on the roller bed. The guide plates cooperate to align and hold the beam within the feed path. As can be seen in FIG. 5, the guide plates are secured to the bed 68 of the roller table assembly 44 by bolts 70 that pass through pairs of transverse slots 72 in horizontal base flanges 74 of the guide plates. The gap between the guide plates, therefore of the thickness of the feed passage which is defined thereby, can thus be adjusted by simply loosening the bolts 70, sliding the guide plates towards or away from one another as desired, and then re-tightening the bolts.

As an incoming beam contacts the plate members and is directed along the feed path, as is indicated by arrow 76 in FIG. 5, it is supported atop the roller table by a plurality of transverse rollers 78. The rollers are suitably non-powered metal rollers, supported by axles 80 from the first and second upstanding edge walls 82*a*, 82*b* of the roller bed. The rollers are spaced by distances suitable to support and maintain the beam in a horizontal orientation; six rollers employed in the illustrated embodiment, however, it will be understood that the number and spacing may vary depending on the types of beams (e.g., wood or metal) with which the apparatus is to be used, and other design factors.

The upper edge of the beam, in turn, is engaged by the upper guide assembly 50. As can be seen in FIGS. 3–4, this includes first and second horizontal-axis rollers 84, and vertical-axis rollers 86 that are mounted in spaced pairs adjacent each of the horizontal-axis rollers. The horizontal-axis rollers 84 engage the upper edges of the beams so as to maintain them in a horizontal orientation, e.g., to prevent the ends of the beams from tipping up or down as they proceed across the bed rollers; as can be seen in FIG. 3, each of the horizontal axis rollers 84 is preferably mounted in vertical alignment with one of the rollers of the bed assembly. The spaced-apart vertical axis rollers 86, in turn, engage the sides of the beams to maintain their alignment in a vertical direction. Similar to the guide plates 66 on the roller table, the vertical-axis rollers 86 are mounted by bolts 88 to brackets 90 having slots (not shown) that allow the rollers to be adjusted inwardly and outwardly to define the desired gap.

Adjustment of both the horizontal-axis and vertical-axis rollers of the upper guide assembly is accomplished by means of a sliding sleeve 92. As can be seen in FIGS. 3–4, the frame 52 that supports both the upper guide assembly and the roller-cutter assembly is mounted to a sleeve 92 which slides vertically on a support stanchion 94; the sleeve and stanchion may be suitably be constructed of square tubing, sized to form a close-fitting, sliding interfit. First and second T-bolts 96 extend through cooperating nuts 98 and bores (not shown) on sleeve 92 to bear against the stanchion 94. Consequently, height adjustment is achieved by slackening the T-bolts, sliding the sleeve and frame to the desired height, and then tightening the bolts to lock the assembly in position.

Figure 6:
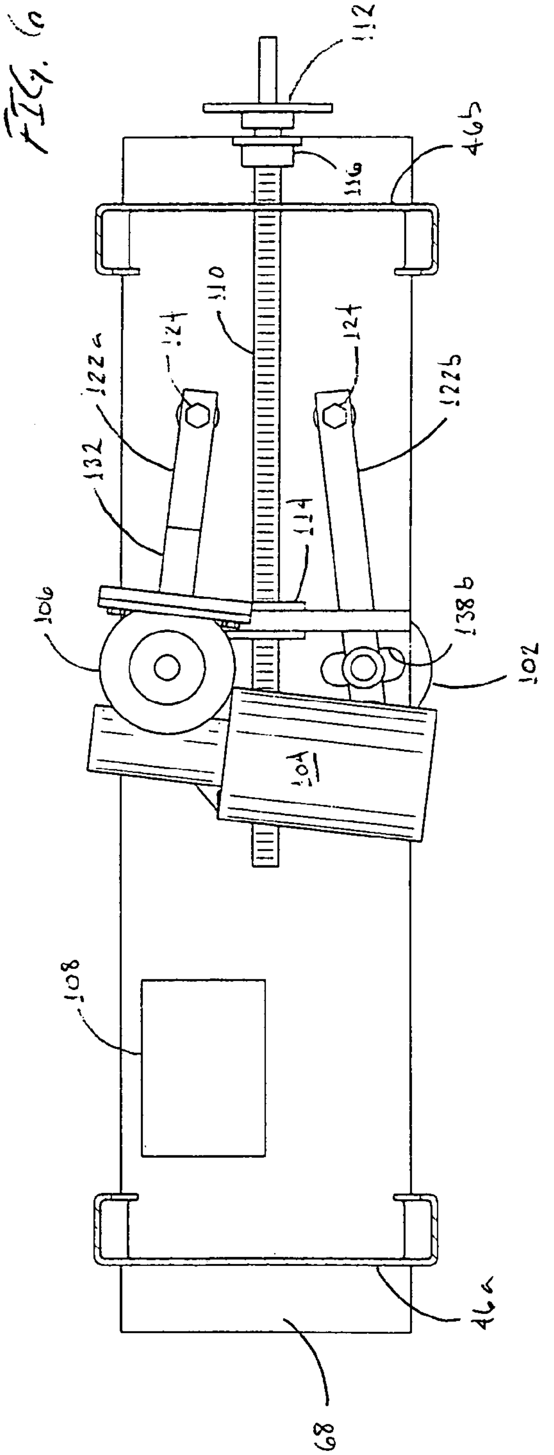
FIG. 6 is a bottom, plan view of the roller table of FIG. 5, taken along line 6—6 in FIG. 3, showing the motor that powers the drive blower of the apparatus.

As the beam passes through the guide plates and proceeds further along the roller table, it is engaged on opposite sides by drive and idler rollers 102. At least the drive roller 100 is formed of hard rubber or other material suitable for establishing frictional engagement with the exterior of the beam, while the idler roller is positioned on the opposite side of the beam so as to stabilize it against the force that is exerted by the drive roller; in some embodiments a sliding plate or other stationary support may be used in place of the idler roller, or both idlers may be driven. As can be seen in FIG. 6 the driver roller is driven from an electric motor 104 via a gearbox 106 that provides a suitable drive ratio. Rotation of the drive roller thus advances the beam along the roller table and through the apparatus in the direction indicated by arrow 76 in FIG. 5. The motor is actuated from a control box 108, which may also include a speed control.

It will be understood that other forms of drive mechanisms may be used to advance the beams through the apparatus, such as a conveyor belt or powered rollers, for example.

Figure 7:
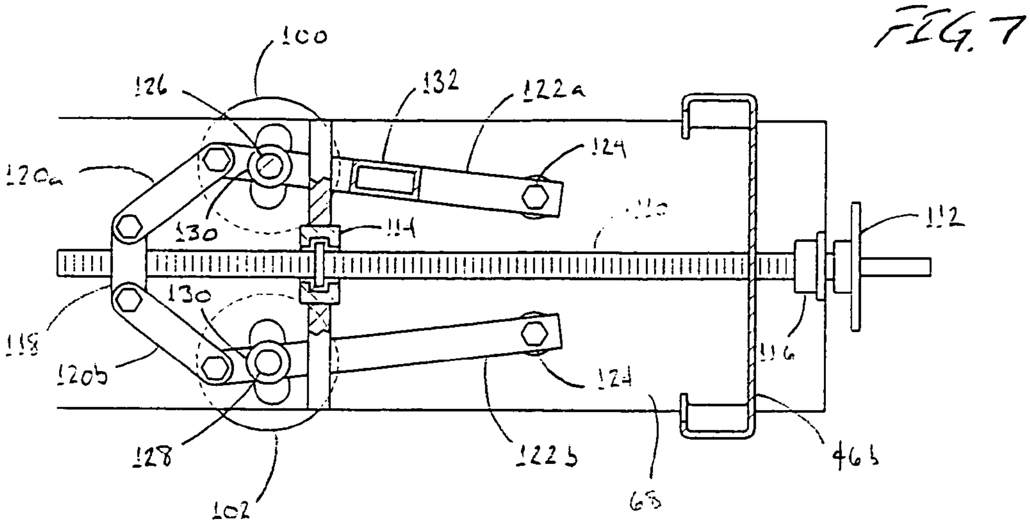
FIGS. 7–9 are partial, plan views of the roller table FIGS. 4–5, taken along line 7—7 in FIG. 3, showing the screw-operated linkage by which the drive and idler rollers are adjusted inwardly and outwardly to accommodate beams having different thicknesses.
Figure 8:
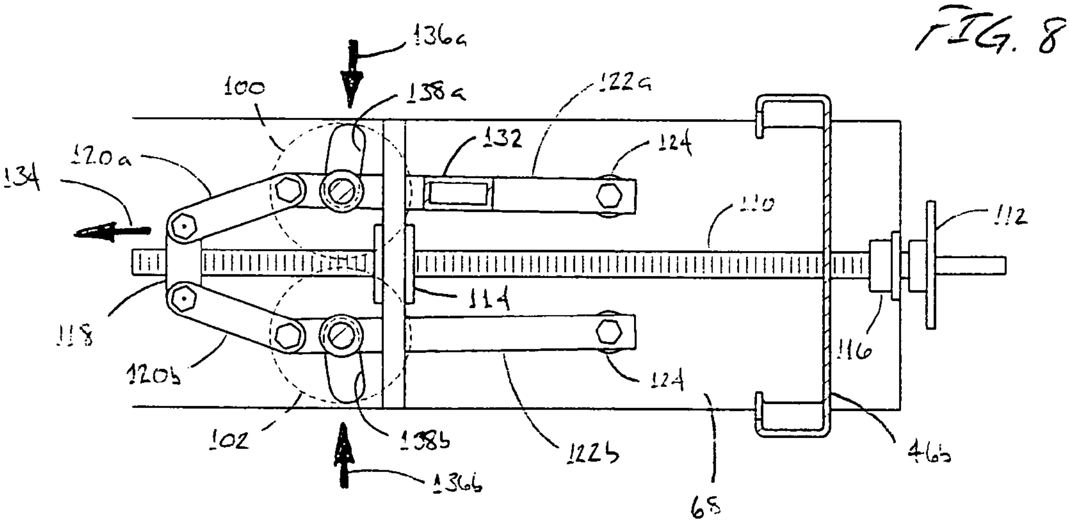
Figure 9:
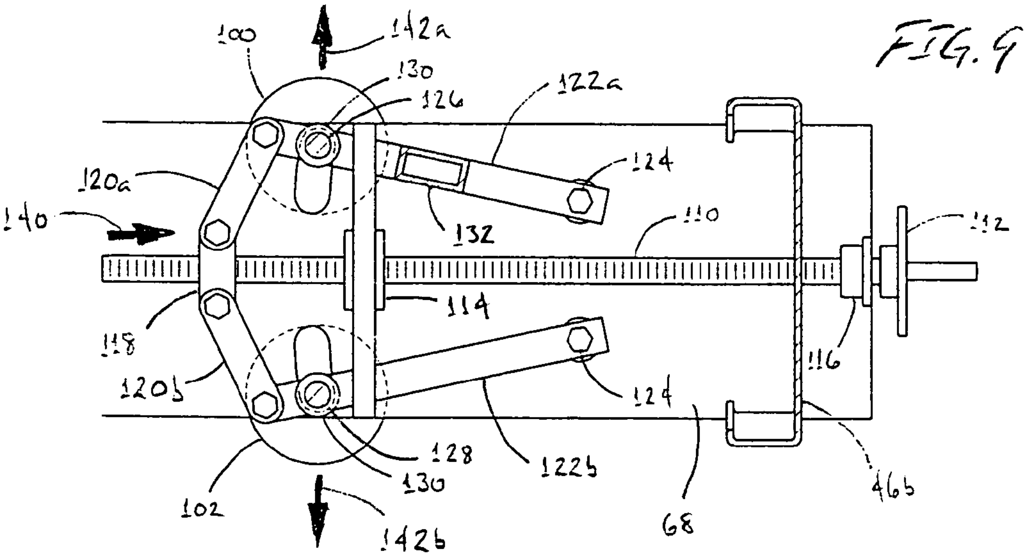

FIGS. 7–9 show the linkage by which the positions of the drive and idler rollers are adjusted to match the thickness of the beams. As can be seen, the linkage includes a longitudinally extending screw shaft 110 that is rotated by a hand crank 112, and which is supported in a longitudinally stationary position by bearings 114, 116. A traveling nut 118 is carried in engagement with the outer end of the rotating screw 110, and has first and second arms 120*a* and 120*b* pivotably mounted thereto. The opposite ends of the two bars 120*a* and 120*b* are pivotably mounted to the outer ends of first and second swing arms 122*a*, 122*b*, respectively. The base ends of the two swing arms are pivotably mounted to the bed 68 of the roller table by bolts 124, with the vertical shafts 126, 128 of the drive and idler rollers being supported in bearings 130 that are mounted at equal distances along the lengths of the two swing arms, generally towards the outer ends thereof. A depending strut 132 is also mounted along the length of the first swing arm 122*a*, towards the middle portion thereof, and supports the motor and associated gear box at its lower end (see also FIG. 3).

Accordingly, rotation of the hand crank 112 in a first (e.g., counter-clockwise) direction causes the nut 18 to travel towards the distal end of the screw shaft, in the direction indicated by arrow 134 in FIG. 8. As this is done, the ends of the bars 120*a* and 120*b* that are mounted thereto pivot towards one another, drawing the drive and idler rollers 100 and 102 together so as to reduce their spacing as indicated by arrows 136*a* and 136*b*, with the shafts/bearings of the two rollers moving through arcuate slots 138*a* and 138*b* that are formed in the bed of the roller assembly. Rotating the hand-wheel in the opposite (e.g., clockwise) direction draws the traveling mount 118 in the direction towards the drive/idler rollers, as indicated by arrow 130 in FIG. 9, thus spreading the ends of the bars 120*a*, 120*b* and the swing arms 120*a*, 120*b* apart so as to increase the distance between the two rollers, as indicated by arrows 142*a* and 142*b*. In this manner the linkage permits the spacing of the drive and other rollers to be adjusted rapidly and accurately, e.g., so that the pressure against the sides of the beams can be adjusted during operation of the apparatus.

Figure 10:
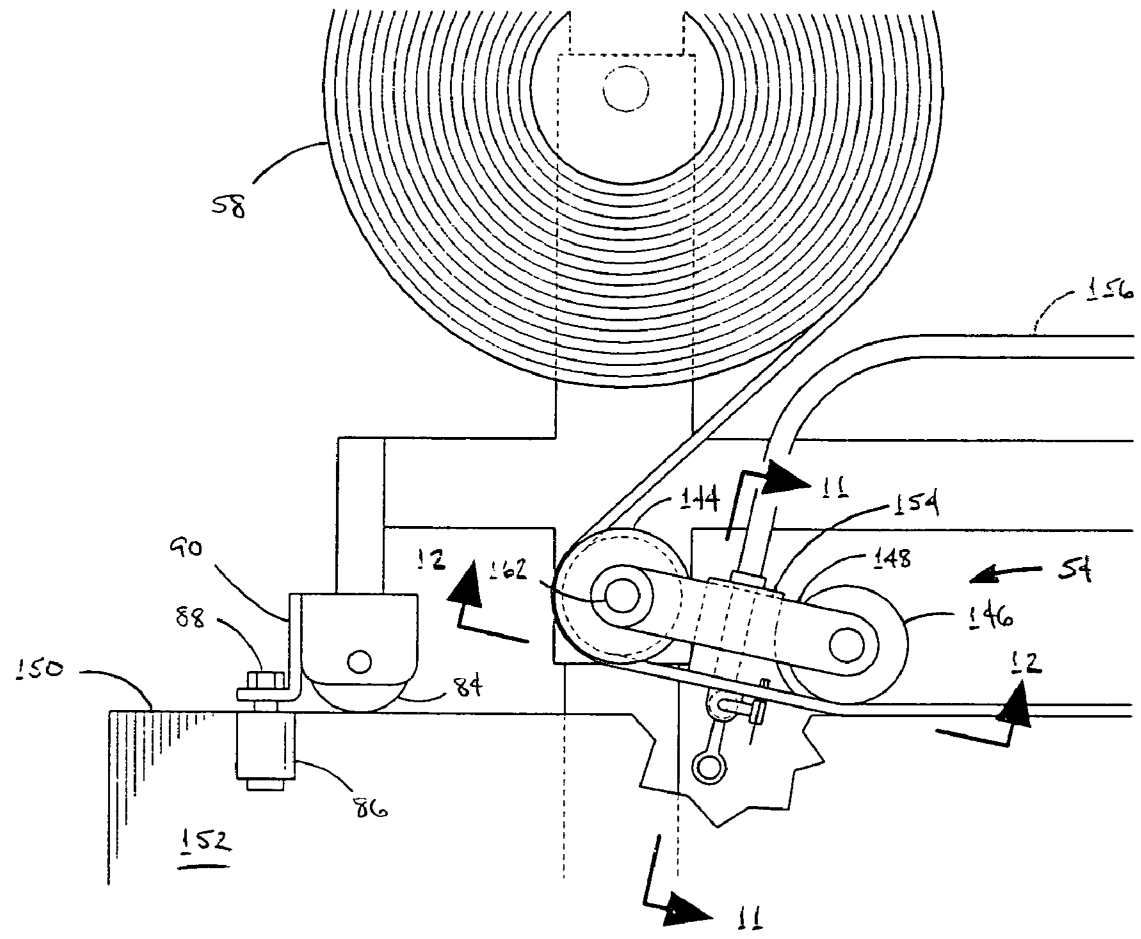
FIG. 10 is a partial side, elevational view of the apparatus of FIGS. 3–4, showing the roller mechanism by which the gasket material is pressed against the upper edge of the beam, and also showing the beam partially broken away to reveal the electrical eye and extensible cutter blade for cutting the strip of gasket material at the end of each beam.

As the beams are fed and guided through the apparatus by the guide and drive rollers described above, a strip of the gasket material is simultaneously applied to the upper edges of the beams by the roller and cutter assembly 54. As can be seen in FIG. 10, the roller and cutter assembly includes leading and trailing rollers that are mounted in a pivoting frame 138 in alignment with the upper edge 150 of the beam 152. A small sliding shoe 154 is mounted to the frame between the leading and trailing rollers, and is connected to a vacuum line 156 that communicates via an internal passage 158 with a section opening 160 on the lower surface of the shoe.

Figure 12:
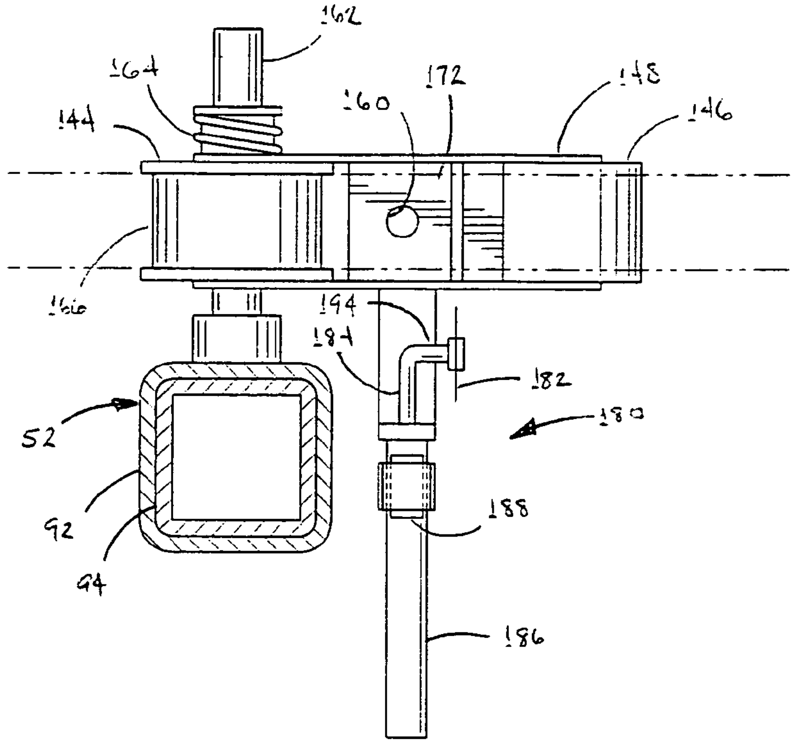
FIG. 12 is a bottom, plan view of the applicator roller and end cutter of FIG. 10, showing the spring mechanism which balances the roller against the upper edges of the beams.

As can be seen in FIG. 12, the frame 148 and leading roller 144 are pivotably mounted to the sliding frame 52 of the apparatus on common pivot shaft 162. A coil spring 164 is mounted around the pivot shaft and interconnects the shaft, and frame 148 so as to yieldingly bias the trailing end thereof in a downward direction, i.e., towards the upper edges of the beams.

As can be seen in FIG. 12 and also FIG. 10, the leading roller 144 of the applicator assembly is provided with a circumferential channel 166 that is sized to correspond to the width of the strip of gasket material. As can be see in FIG. 13, the channel acts as a guide for the strip of gasket material 170 that is unrolled from spool 158, directing it under the shoe 154 and trailing roller 146. The trailing roller 146, in turn, has a cylindrical outer surface that presses the strip downwardly against the upper edge of the beam, under the force exerted by spring 164, so that the adhesive lower surface of the gasket material firmly adheres the strip to the upper edge of the beam.

Figure 16:
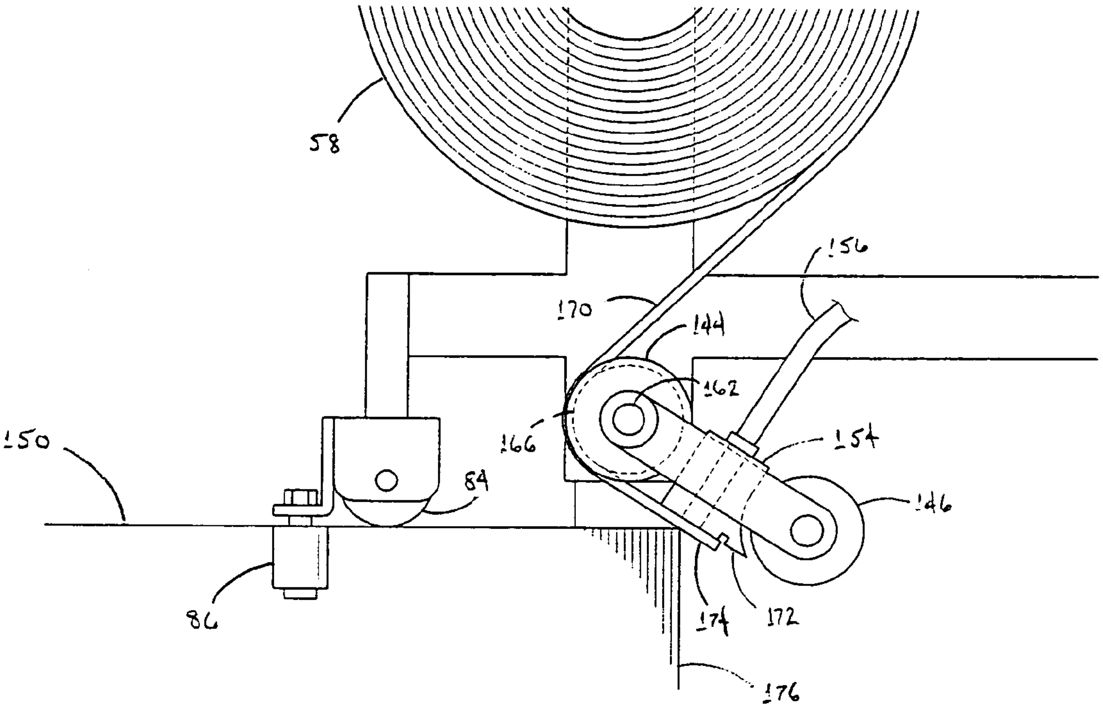
FIG. 16 is a side, elevational view of the roller and cutter assembly of FIGS. 10–15, similar to FIG. 13, showing the position of the lower roller and blade assembly as it meets the leading end of a beam entering the apparatus so as to begin applying the strip of gasket material thereto.

The shoe 154 between the rollers serves to guide the strip under the trailing roller, and also holds the free end of the strip during the intervals between adjacent beams passing through the apparatus; the shoe is suitably formed of molded nylon or other low-friction material. As can be seen in FIG. 16, the suction force that is exerted by the vacuum at the opening 60 in the lower face of 172 of the shoe holds the free end 174 of the strip in place, in an orientation that extends downwardly so as to contact the end 176 of the advancing beam at a somewhat diagonal angle. As contact occurs, the shoe presses the adhesive lower surface of the strip against the beam while the frame 154 begins to pivot upwardly so that the strip is lead on to the upper edge 150 of the beam. As the beam continues to advance, the strip is pulled across the lower surface 172 of the shoe 154 (overcoming the suction this is exerted by the vacuum) and then under the trailing roller 146. The strip is thus adhered to the upper edge of the beam, with additional gasket material being unwound from the spool 58 by the tension that is generated by the forward motion of the beam.

Figure 13:
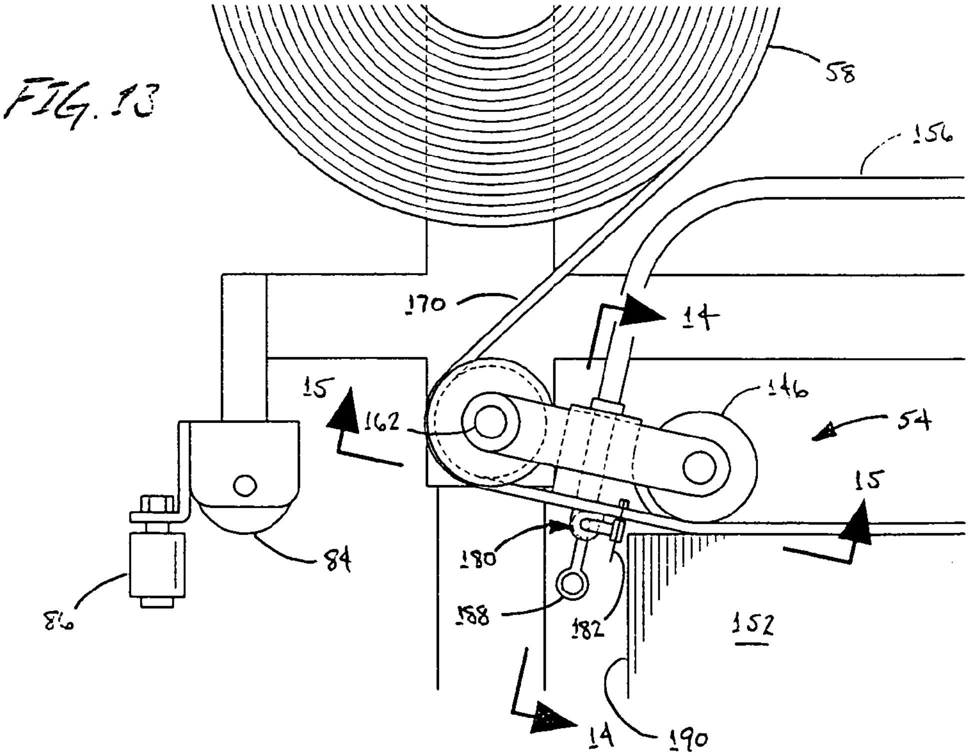
FIG. 13 is a side, elevational view of the roller and cutter assembly of FIGS. 10–12, showing the position of the assembly when it is reached by the trailing end of a beam passing through the apparatus.

The strip of gasket material is thus adhered to the full length of each beam. As the end of the beam reaches the roller and cutter assembly, as shown in FIG. 13, the cutter unit 180 is actuated to cut the strip to length, after which the assembly returns to the position shown in FIG. 16 to await the next incoming beam.

As can be seen in FIG. 12, the cutter unit includes a cutter wheel 182 that is disposed towards the strip and is mounted on the end of a shaft 184 that is selectively extensible by means of a pneumatic cylinder 186. The cylinder is actuated through control circuitry (not shown) by an electric eye 188 that detects the trailing end 190 of the beam. Use of a pneumatic cylinder to actuate the cutter wheel is preferred for cleanliness, reliability, and low cost, however, it will be understood that other forms of actuators can be employed, such as a hydraulic cylinder or a mechanical linkage or cam, for example.

Figure 14:
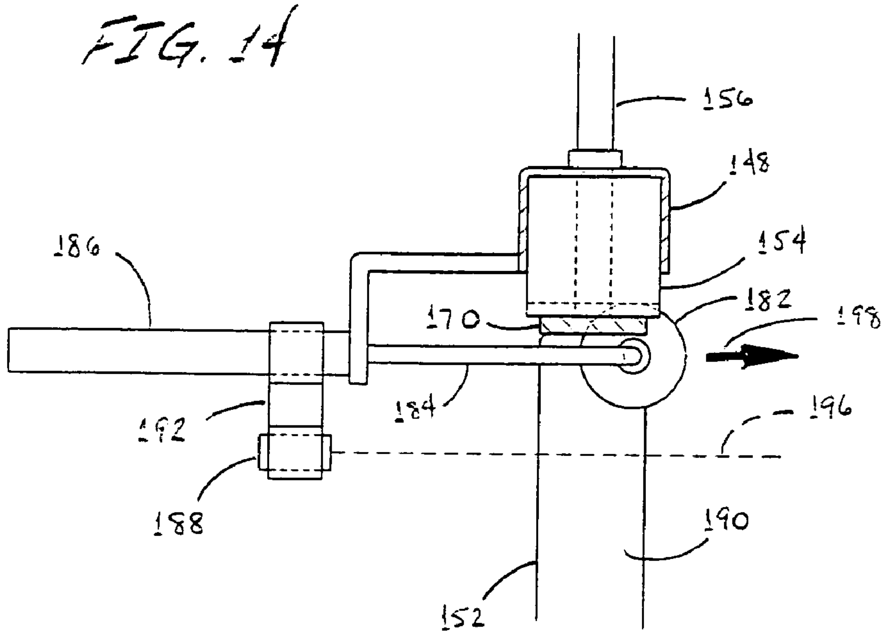
FIG. 14 is an end, cross-sectional view of the roller and cutter assembly of FIGS. 10–13, taken along line 14—14 in FIG. 13 showing the manner in which the cutter blade is extended in response to the end of the beam being detected by the electric eye of the assembly.
Figure 15:
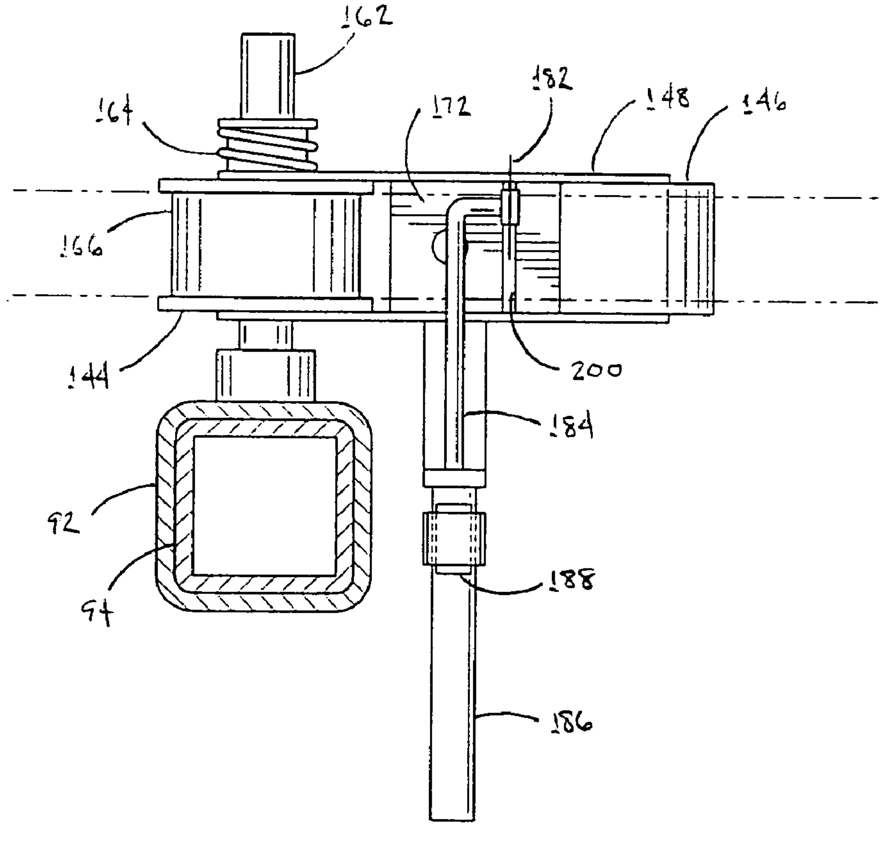
FIG. 15 is a bottom, plan view of the roller and cutter assembly of FIGS. 10–14, taken along line 15—15 is FIG. 13, showing the relationship of the cutting blade to the strip of gasket material as the blade is extended therethrough.

As can be seen in FIG. 14, the electrical eye 188 is mounted below the pneumatic cylinder 186 on a bracket 192 so that the beam lies in substantially the same vertical plane as the cutter rod 184. The end 194 of the cutter rod is bent laterally in the direction of motion of the beams, both to provide an axle mount for the cutter wheel, and also to provide an offset for the cutter wheel that compensates for the time required for the rod to extend and therefore ensures that the strip will be cut more closely to the end of the beam.

Figure 11:
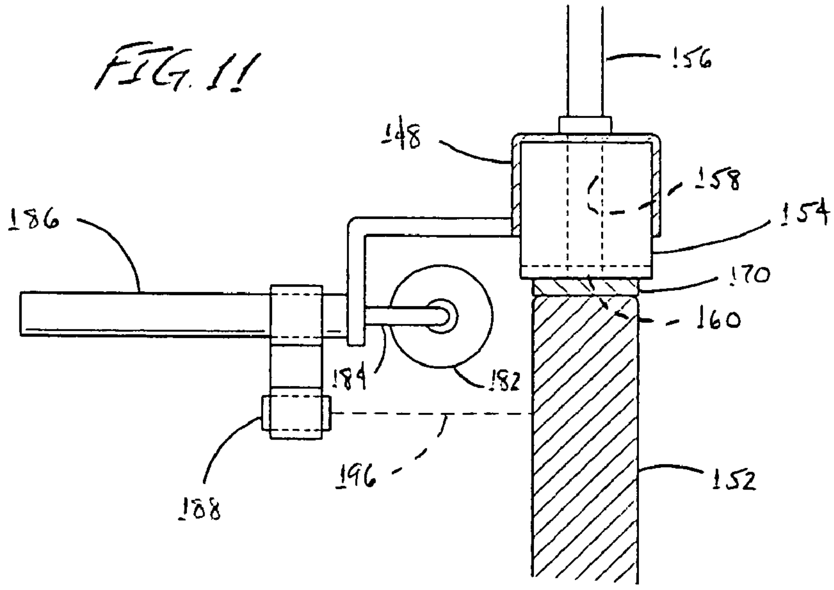
FIG. 11 is an end, elevational view of the electric eye and extensible cutter blade of FIG. 10, showing their relationship to the beam and the strip of gasket material on the upper edge thereof.

Thus, as can be seen in FIG. 11, the detector beam 196 that is generated by the electric eye and/or an associated light source (not shown) is blocked by the body of the beam 152 as the latter is passing under the roller cutter assembly. However, when the end 190 of the beam is reached and it passes from in front of the electric eye 188, as shown in FIG. 14, the detector beam 196 becomes unmasked. The unmasking is sensed by the electric eye and/or an associated sensor on the opposite side (not shown), generating a signal which actuates cylinder 186 to extend the cutter rod 184 and cutter wheel 182, in the direction indicated by arrow 198 in FIG. 14. As this is done, the upper edge of the cutter wheel contacts the strip 170 and begins cutting the latter, with the wheel developing a rolling action as the rod continues to extend. A transverse channel 200 is formed in the lower surface of the shoe 154 and receives the edge of the cutter wheel at a level above the upper surface of the gasket material, thus ensuring a clean, positive cutting action. After the cut has been completed, the rod and cutter wheel are retracted by a return spring in the pneumatic cylinder 186, returning to the original position in preparation for the next cut.

The electric eye employed in the preferred embodiment provides several advantages, particularly in terms of reliability, however, it will be understood that other forms of sensor mechanisms may be employed to detect the end of each beam, such as various forms of limit switches, for example.

As the application process continues, the supply of gasket material is eventually depleted from the spool 58. A standby spool 202 (see FIG. 3) is rotatingly supported by an arm 204 adjacent the primary spool 58, with the free end of the next strip gasket material hanging downwardly from the standby spool. When the end of the first spool is reached, the operator simply slows the drive mechanism and then pulls the free end of the strip down from the standby spool and presses it on top of the beam adjacent the tail end of the previous strip. The strip from the standby spool then continues to feed under the cutter and roller assembly 54, while the operator removes the depleted spool 58 and places the next spool 202 in its position. Another full spool is then obtained and placed in the standby position. In this matter, a virtually continuous application process can be maintained.

It is to be recognized that various alterations, modifications, and/or additions may be introduced into the constructions and arrangements of parts described above without departing from the spirit or ambit of the present invention.

What is claimed is:

1. An apparatus for applying strips of resiliently compressible gasket material to upper edges of elongate beams that are fed therethrough, said apparatus comprising:

a bed assembly having a plurality of horizontal axis rollers that support said beams for passage thereover;

first and second guide plates mounted at an entry end of said bed assembly that engage said beams so as to align said beams in an on-edge orientation with lower edges thereof supported on said rollers of said bed assembly;

first and second vertical axis rollers that press against opposite vertically extending sides of said beams in said on-edge orientation, at a location proximate lower edges of said beams, so that at least one of said vertical axis rollers establishes frictional engagement with said beams;

a motor that drives said vertical axis roller in frictional engagement with said beams so as to advance said beams over said table assembly;

means for selectively adjusting spacing between said vertical axis rollers to accommodate beams having differing thicknesses;

first and second pairs of vertical axis idler rollers that engage opposite, vertically extending sides of said beams in said on-edge orientation, at a location proximate said upper edges of said beams, so as to support said beams in said on-edge orientation, said first and second pairs of vertical axis rollers being mounted at longitudinally spaced locations so as to engage said beams at separate points along the lengths thereof;

first and second horizontal axis idler rollers that engage said upper edges of said beams in said on-edge orientation, so as to maintain said beams in horizontal alignment while advancing through said apparatus, said first and second horizontal axis idler rollers being mounted at longitudinally spaced locations so as to engage said beams at separate points along the lengths thereof;

a horizontal axis applicator roller that is biased against said upper edges of said beams, said applicator roller being mounted at a location intermediate said spaced apart locations of said horizontal axis idler rollers and said pairs of vertical axis idler rollers;

means for guiding a strip of said resiliently compressible gasket material under said applicator roller so that an adhesive layer on a lower surface of said strip is pressed into adhesive engagement with said upper edges of said beams;

a blade member mounted proximate said applicator roller, on a side of said applicator idler towards said entry end of said table assembly; and means for extending said blade member so as to sever said strip of resiliently compressible gasket material in response to said strip reaching an end of a beam passing through said assembly.

2. The apparatus of claim 1, further comprising:

first and second axles that extend vertically through said bed assembly between said horizontal axis rollers of said bed assembly and that have said vertical axis rollers mounted to upper ends thereof, one of said axles having an upper end mounted to said roller that establishes frictional engagement with said beams and a lower end that is operatively connected to said motor.

3. The apparatus of claim 2, wherein said means for selectively adjusting spacing between said vertical axis rollers comprises:

first and second swing arms, each of said swing arms having a first end that is pivotally mounted to said table assembly and a second end that supports one of said axles; and means for selectively adjusting an angular relationship between said swing arms so as to adjust said spacing between said vertical axis rollers on said axles that are supported by said swinging arms.

4. The apparatus of claim 3, wherein said means for selectively adjusting said angular relationship between said swinging arms comprises:

first and second spreader bars having first ends pivotally mounted to said ends of said swing arms that support said axles;

a traveling nut that is pivotally mounted to second ends of said spreader bars;

a threaded shaft in operative engagement with said traveling nut; and means for selectively rotating said threaded shaft, in a first direction such that said traveling nut and spreader bars draw said swing arms together to a narrower angle, and in a second direction such that said traveling nut and spreader bars spread said swing arms apart to a wider angle.

5. The apparatus of claim 4, wherein said means for rotating said threaded shaft comprises:

a manually operable handwheel mounted to an end of said shaft.

6. The apparatus of claim 3, further comprising:

a support bracket extending downwardly from one of said swing arms, said support bracket having said motor mounted thereon so that said motor is positioned beneath said horizontal rollers of said bed assembly.

7. The apparatus of claim 3, wherein said means for guiding a strip of said resiliently compressible gasket material under said applicator roller comprises:

a leading roller having a circumferential channel that aligns said strip with said applicator; and a guide shoe positioned between said leading and applicator rollers, that guides said strip from said leading roller to under said applicator roller.

8. The apparatus of claim 7, wherein said blade member is positioned to sever said strip of resiliently compressible gasket material at a location intermediate said leading and applicator rollers, so that severed ends of said strip are fed under said applicator roller as said ends of said beams pass thereunder.

9. The apparatus of claim 8, wherein said means for extending said blade member comprises:

means for extending said blade member across said guide shoe so as to cut said strip against a lower surface of said shoe.

10. The apparatus of claim 9, wherein said blade member comprises:

a rotating cutter wheel.

11. The apparatus of claim 10, wherein said guide shoe comprises:

a transverse channel that receives an edge of said cutter wheel as said cutter wheel is extended across said lower surface of said guide shoe, so that said cutter wheel forms a clean cut through said strip of resiliently compressible gasket material.

12. The apparatus of claim 9, further comprising:

means for retaining a free end of said strip of resiliently compressible gasket material against said lower surface of said guide shoe after said strip has been severed by said blade member.

13. The apparatus of claim 12, wherein said means for retaining said free end of said strip of resiliently compressible material against said lower surface of said guide shoe comprises:

a bore having an opening at said lower surface of said guide shoe; and a vacuum line that communicates through said bore so as to supply a suction that holds said strip against said lower surface of said guide shoe.

14. The apparatus of claim 12, further comprising:

means for biasing said guide shoe to a downward angle so that said free end of said strip that is retained on said lower surface thereof contacts leading ends of said beam entering said apparatus.

15. The apparatus of claim 14, further comprising a pivotable support assembly for said guide shoe and said guide and applicator rollers, said pivotable support assembly comprising:

a frame;

a first axle at a distal end of the frame that supports said applicator roller thereon;

a second axle at an opposite end of said frame that supports said guide roller thereon;

said frame being pivotably mounted to said second axle and said second axle having an end that is mounted to a support member;

said guide shoe being mounted to a middle portion of said frame intermediate said guide and applicator rollers; and a spring in operative engagement with said frame that biases said pivotable support assembly to said downward angle.

16. The apparatus of claim 15, wherein said blade member is mounted to said frame of said pivotable support assembly, and said means for extending said blade member comprises:

means for extending said blade member from a side of said frame to across said lower surface of said guide shoe so as to sever said strip of resiliently compressible gasket material.

17. The apparatus of claim 16, wherein said means for extending said blade member further comprises:

a sensor that provides an actuating signal to extend said blade member in response to detection of trailings ends of said beams passing thereby.

18. The apparatus of claim 17, wherein said sensor comprises:

an electric eye.

19. The apparatus for claim 18, wherein said electric eye is mounted to said frame of said pivoting support assembly so as to be positioned closely adjacent said blade member.

20. The apparatus of claim 15, further comprising:

a spindle mounted to said support member generally above said second axle of said pivoting support assembly, that rotatingly supports a roll of said resiliently compressible gasket material, from which said strip of material is fed downwardly to said guide roller.

* * * * *

UNITED STATES PATENT AND TRADEMARK OFFICE

CERTIFICATE OF CORRECTION

PATENT NO. : 7,172,004 B1
APPLICATION NO. : 10/915150
DATED : February 6, 2007
INVENTOR(S) : Charles Corston It is certified that error appears in the above-identified patent and that said Letters Patent is hereby corrected as shown below:

On the Title Page, add item number 60 under Related U.S. Application Data:

(60) Provisional application No. 60/493,605, filed on Aug. 8, 2003.

Signed and Sealed this

Tenth Day of March, 2009

JOHN DOLL
*Acting Director of the United States Patent and Trademark Office*